March 18, 1930.  R. MARTIN  1,751,046
BALL COCK
Filed Aug. 18, 1928

INVENTOR
Ross Martin
BY
Chappell & Earl
ATTORNEYS

Patented Mar. 18, 1930

1,751,046

UNITED STATES PATENT OFFICE

ROSS MARTIN, OF ELKHART, INDIANA, ASSIGNOR TO NORTHERN INDIANA BRASS COMPANY, OF ELKHART, INDIANA

BALL COCK

Application filed August 18, 1928. Serial No. 300,510.

The main object of this invention is to provide a ball cock for flushing tanks and the like in which the incoming water produces very little noise.

A further object is to provide a ball cock embodying these advantages which is very economical and durable in structure.

Objects relating to details and economies of my invention will appear from the description to follow. The invention is defined and pointed out in the claims.

A structure which is a preferred embodiment of my invention is illustrated in the accompanying drawing, in which.

Figures 1, 2:
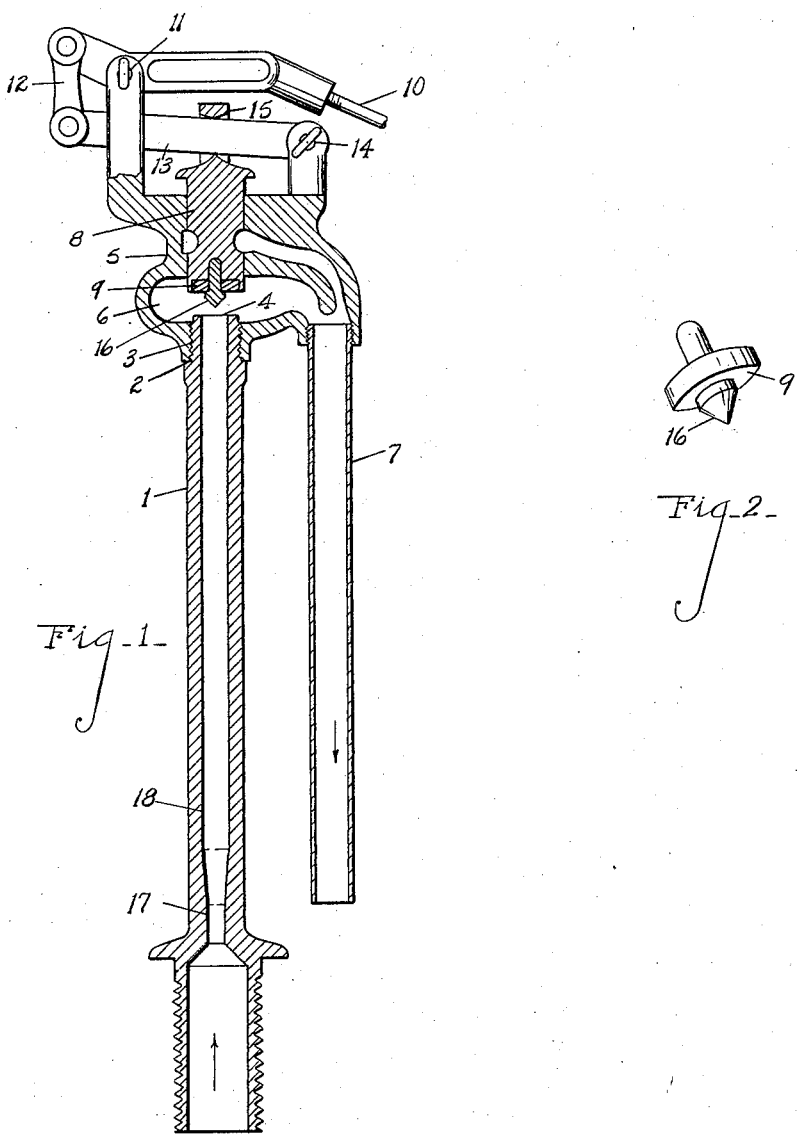
Fig. 1 is a detail view mainly in vertical central section.
Fig. 2 is a perspective view of the tip member which I mount upon the valve.

Referring to the drawing, 1 represents the supply pipe or riser which is mounted within a tank, the coupling fixtures for mounting the riser being omitted.

The supply pipe has a shoulder 2 adjacent its upper end, and a threaded portion 3 above this shoulder, its upper end 4 constituting a valve seat.

The valve casing 5 is mounted upon the upper end of the supply pipe, being threaded to coact with the threaded portion 3 thereof and engage the shoulder 2. The casing has a delivery chamber 6 into which the end of the supply pipe projects.

A discharge or supply tube 7 is provided for this chamber.

A plunger valve 8 is provided with a facing 9 adapted to coact with the seat 4 on the end of the supply pipe.

A float arm 10 is pivoted at 11 and connected by a link 12 to the lever 13 which is in turn pivoted at 14, being passed through the loop 15 on the valve so that the valve is opened and closed by the action of a float not illustrated here.

The valve is provided with a conical tip 16 while the supply pipe has a restriction 17 spaced substantially from the delivery end of the pipe. This restriction is preferably upwardly expanded, that is, it gradually enlarges to the full bore 18 of the supply pipe.

When the valve 8 is opened to its full capacity, the tapered tip 16 is withdrawn from the end of the pipe, allowing full flow of the water at this point, the pressure being reduced, however, by the restricted portion of the supply pipe. As the float rises to shut off the water, the tip is gradually introduced into the end of the pipe, cutting down the portage, thereby gradually limiting the flow of water or restricting the portage. With the parts thus arranged, the incoming water makes comparatively little noise.

I have illustrated and described my improvements in an embodiment which I consider as very practical and efficient. I have not attempted to illustrate and describe other embodiments and adaptations as I believe this disclosure will enable those skilled in the art to embody or adapt my improvements as may be desired.

Having thus described my invention, what I claim as new and desire to secure by Letters Patent, is:

1. In a ball cock, the combination of a supply pipe having an upwardly expanding restriction spaced from its upper end, the upper end of said supply pipe constituting a valve seat, a valve casing mounted on said supply pipe and having a chamber enclosing said valve seat, and a plunger valve mounted in said casing to coact with said valve seat and provided with a flat surface and with a central conical tip disposed centrally relative to said supply pipe and adapted to enter the same when the valve is moved toward seating position, gradually restricting the discharge capacity of the supply pipe prior to the seating of the valve.

2. In a ball cock, the combination of a supply pipe having a restriction spaced from its upper end, the upper end of said supply pipe constituting a valve seat, a valve casing mounted on said supply pipe and having a chamber enclosing said valve seat, and a plunger valve mounted in said casing to coact with said valve seat and provided with a flat surface and with a central conical tip disposed centrally relative to said supply pipe and adapted to enter the same when the valve is moved toward seating position, gradually restricting the discharge capacity of the supply pipe prior to the seating of the valve.

3. In a ball cock, the combination of a supply pipe having an upwardly expanding restriction spaced from its discharge end, the cross-sectional area of the discharge end of the pipe exceeding the cross-sectional area of said restriction therein, and a valve for said supply pipe provided with a conical projection disposed centrally of said discharge end and acting to gradually restrict the portage of the discharge end as the valve is moved toward its seat in advance of the seating of the valve.

In witness whereof I have hereunto set my hand.

ROSS MARTIN.